(12) United States Patent
Ohlmeier (10) Patent No.: US 8,848,934 B2
(45) Date of Patent: Sep. 30, 2014

(54) CONTROLLING AUDIO SIGNALS

(75) Inventor: Nils Ohlmeier, San Jose, CA (US)

(73) Assignee: Skype, Dublin (IE)

( * ) Notice: Subject to any disclaimer, the term of this patent is extended or adjusted under 35 U.S.C. 154(b) by 480 days.

(21) Appl. No.: 12/963,353

(22) Filed: Dec. 8, 2010

(65) Prior Publication Data

US 2012/0148059 A1    Jun. 14, 2012

(51) Int. Cl.
*H04B 3/20* (2006.01)
*H04B 15/00* (2006.01)
*H04M 1/60* (2006.01)
*H04M 1/20* (2006.01)
*H04M 9/08* (2006.01)
*H04M 1/725* (2006.01)

(52) U.S. Cl.
CPC ............ *H04B 15/00* (2013.01); *H04M 1/6033* (2013.01); *H04M 1/20* (2013.01); *H04M 1/605* (2013.01); *H04M 9/082* (2013.01); *H04M 1/6041* (2013.01); *H04M 1/72558* (2013.01)
USPC ............ 381/66; 381/94.1; 381/345; 381/351; 381/352; 381/353; 381/354; 381/338; 381/332; 381/333; 381/334; 381/335; 381/336; 381/337; 455/90.3; 455/569.1; 455/575.1; 455/575.2; 455/575.3; 379/406.01; 379/406.03; 379/420.02; 379/420.01

(58) Field of Classification Search
USPC .......... 381/66, 94.1, 345, 351, 352, 353, 354, 381/332–338; 455/90.3, 569.1, 575.1, 455/575.3; 379/406.01, 406.03, 420.02, 379/420.01
See application file for complete search history.

(56) References Cited

U.S. PATENT DOCUMENTS 5,263,079 A    11/1993    Umemoto
5,490,208 A *    2/1996    Remillard ................. 379/93.19

(Continued)

FOREIGN PATENT DOCUMENTS

EP    1838075 A1 *    9/2007
WO    WO2009093890 A *    7/2009

OTHER PUBLICATIONS

Notification of Transmittal of the International Search Report and the Written Opinion of the International Searching Authority for Int'l Application No. PCT/EP2011/065041; Date Mailed: Dec. 2, 2011, 13 pp.

*Primary Examiner* — Davetta W Goins
*Assistant Examiner* — Kuassi Ganmavo
(74) *Attorney, Agent, or Firm* — Sonia Copper; Jim Ross; Micky Minhas (57) ABSTRACT

Method, user terminal and computer program product for controlling audio signals at the user device during a communication session between the user device and a remote node, in which a primary audio signal is received at audio input means of the user device for transmission to the remote node in the communication session. It is determined whether the user device is operating in (i) a first mode in which secondary audio signals output from the user device are likely to disturb the primary audio signal received at the audio input means, or (ii) a second mode in which secondary audio signals output from the user device are not likely to disturb the primary audio signal received at the audio input means. In dependence upon determining that the user device is operating in the first mode, the secondary audio signals are selectively suppressed from being output from the user device during the communication session, such that when the user device is operating in the first mode said secondary audio signals do not disturb the primary audio signal received at the audio input means for transmission to the remote node in the communication session.

17 Claims, 2 Drawing Sheets

(56) References Cited

U.S. PATENT DOCUMENTS

| | | | |
|---|---|---|---|
| 6,281,925 B1* | 8/2001 | Kosaka | 348/14.02 |
| 6,889,066 B2* | 5/2005 | Gupta et al. | 455/570 |
| 6,944,880 B1* | 9/2005 | Allen | 725/106 |
| 7,127,271 B1 | 10/2006 | Fujisaki | |
| 7,292,880 B2* | 11/2007 | Lehtonen | 455/569.1 |
| 7,400,917 B2* | 7/2008 | Wood et al. | 455/575.8 |
| 7,920,696 B2* | 4/2011 | Chew | 379/388.02 |
| 7,961,900 B2* | 6/2011 | Zurek et al. | 381/354 |
| RE42,928 E * | 11/2011 | Yang | 455/556.1 |
| 8,078,188 B2* | 12/2011 | Zivney | 381/119 |
| 8,253,772 B2* | 8/2012 | Book | 348/14.01 |
| 2006/0018451 A1* | 1/2006 | Usuba et al. | 379/101.01 |
| 2006/0067512 A1* | 3/2006 | Boillot et al. | 379/388.04 |
| 2006/0166652 A1* | 7/2006 | Hwang | 455/412.1 |
| 2007/0060054 A1* | 3/2007 | Romesburg | 455/41.2 |
| 2007/0123299 A1 | 5/2007 | Ragan | |

\* cited by examiner

CONTROLLING AUDIO SIGNALS

FIELD OF THE INVENTION

The present invention relates to controlling audio signals. In particular, the present invention relates to controlling audio signals at a user device during a communication session.

BACKGROUND

Communication systems allow users to communicate with each other over a network. The network may be, for example, the internet or the Public Switched Telephone Network (PSTN). Audio signals can be transmitted between nodes of the network, to thereby allow users to transmit and receive audio data (such as speech data) to each other in a communication session over the communication system. A microphone can be used at a user device to receive audio signals (e.g. speech) from a user for transmission to a remote node in a communication session. As well as the audio signals from the user, the microphone may also receive other audio signals, such as background noise, which may disturb the audio signals received from the user.

A user device comprising audio input means such as a microphone for receiving audio signals from a user may also have audio output means such as speakers for outputting audio signals to the user. When in a communication session, the speakers are intended to output audio signals from an application handling calls over the communication system. However, the speakers may also be used to output audio signals from other applications which are executed at the user device. For example, the user device may be a mobile phone which has an application for playing music through the speakers. When the user device is engaging in a call, the microphone of the audio device is intended to receive speech or other audio signals provided by the user intended for transmission to a remote node in a communication session. However, the microphone may pick up unwanted audio signals which are output from the speakers of the user device. The unwanted audio signals output from the user device may contribute to disturbance to the primary audio signals received at the microphone from the user for transmission in the call. There are two approaches for addressing this situation.

In a first approach, media output may be suppressed when a call is received such that the audio output is available for the call only. For example, some mobile phones that have mp3 players will pause the music when the mobile phone is engaging in a call.

As an alternative to the first approach, in a second approach, audio signals are not suppressed from being output from the user device during a call. By deliberately not suppressing audio signals from being output during a call, the user can listen to audio signals output from an application executing on the user device during a call. As an example, this approach allows a user to continue to listen to music output from his user device during a call. As another example, event sounds may be output from the user's device during an active call such that while the user is in an ongoing call an application handling the call may itself play sounds for other events (such as incoming instant messages or contacts in the communication system going on- or off-line), which occur during the call. Other applications that are running at the time of the active call at the user device may also output audio signals, as the user uses these applications while simultaneously engaging in the call.

SUMMARY

The inventors have realised that there are problems with each of the two approaches described above. When adopting the first approach the user is unable to continue listening to music (or to other secondary audio signals which are not intended to be transmitted from the user device as part of the call) during the call. However, when adopting the second approach the microphone of the user device may receive the audio signals that are output from the speakers of the user device, and as a result the remote side of the call may hear all the audio signals output at the user device, even though those audio signals may not be meant to be part of the call. There are therefore two conflicting factors to consider and the inventors have realised that different approaches may be advantageous in different circumstances and in particular when the user device is operating in different modes.

As such, the inventors have realised that the extent of the disturbance caused by secondary audio signals output from the user device to the primary audio signals received at the user device from the user for transmission in a communication session may be greater in some operational modes of the user device than in other operational modes of the user device. For example, this disturbance can be a larger problem when the user device is operating in a hands-free mode, as compared to when the user device is not operating in the hands-free mode. In one example of a hands-free mode an open microphone and a speaker located in the housing of the user device are used to receive and output audio signals. In one example of a non hands-free mode, a headset is used which includes a directional microphone and earpieces for receiving and outputting audios signals respectively.

According to a first aspect of the invention there is provided a method of controlling audio signals at a user device during a communication session between the user device and a remote node, the method comprising: receiving a primary audio signal at audio input means of the user device for transmission to the remote node in the communication session; determining whether the user device is operating in (i) a first mode in which secondary audio signals output from the user device are likely to disturb the primary audio signal received at the audio input means, or (ii) a second mode in which secondary audio signals output from the user device are not likely to disturb the primary audio signal received at the audio input means; and in dependence upon determining that the user device is operating in the first mode, selectively suppressing the secondary audio signals from being output from the user device during the communication session, such that when the user device is operating in the first mode said secondary audio signals do not disturb the primary audio signal received at the audio input means for transmission to the remote node in the communication session.

In this way the secondary audio signals are suppressed if the user device is operating in the first mode. When the user device operates in the first mode (in which secondary audio signals output from the user device are likely to disturb the primary audio signal received at the audio input means) then the secondary audio signals are suppressed such that they do not disturb the primary audio data received at the audio input means for transmission to the remote node. However, when the user device operates in the second mode (in which secondary audio signals output from the user device are not likely to disturb the primary audio signal received at the audio input means) then the secondary audio signals might not be suppressed, thereby allowing a user of the user device to continue to listen to the secondary audio signals during a communication session if the secondary audio signals are not likely to disturb the primary audio signal received at the audio input means for transmission to the remote node.

The first mode may be a hands-free mode. As described above, in one example of a hands-free mode an open microphone and a speaker located in the housing of the user device are used to receive and output audio signals. The second mode may be a non hands-free mode. As described above, in one example of a non hands-free mode, a headset is used which includes a directional microphone and earpieces for receiving and outputting audio signals respectively. However, what distinguishes the first mode from the second mode is not whether a user is required to use his hands to operate the user device, but is instead that in the first mode secondary audio signals output from the user device are likely to disturb the primary audio signal received at the audio input means, whereas in the second mode secondary audio signals output from the user device are not likely to disturb the primary audio signal received at the audio input means. It may be considered that the secondary audio signals output from the user device are "likely" to disturb the primary audio signal received at the audio input means if when the secondary audio signals are output from the user device at a normal operational volume, they are received at the audio input means with a signal strength above a threshold above which which they are considered to disturb the primary audio signal received at the audio input means.

The method may further comprise outputting, from audio output means of the user device, audio data received at the user device from the remote node in the communication session.

The secondary audio signals may be generated by an application which is involved in the communication session, but wherein the secondary audio signals are not intended to be transmitted to the remote node in the communication session. Alternatively, the secondary audio signals may be generated by an application which is not involved in the communication session. The primary audio signal may be a speech signal received at the audio input means from a user.

The step of determining whether the user device is operating in the first mode or the second mode may comprise determining the activity of an echo canceller or an echo suppressor at the user device. If said activity of the echo canceller or the echo suppressor indicates that audio signals output from the user device are received at the input means with a signal strength above a threshold strength then it may be determined that the user device is operating in the first mode.

The step of determining whether the user device is operating in the first mode or the second mode may comprise determining a type of the user device, wherein it may be determined that the user device is operating in the first mode if it is determined that a type of the user device indicates that the user device is capable of operating only in the first mode. The determining of the type of the user device may comprise determining a device ID identifying the user device. The step of determining whether the user device is operating in the first mode or the second mode may comprise determining the type of the audio input means. The step of determining whether the user device is operating in the first mode or the second mode may comprise accessing an indicator of the current mode from a store of the user device.

Suppressing the secondary audio signals may comprise suppressing the output of the secondary audio signals for the duration of the communication session or suppressing the output of the secondary audio signals during the communication session for the time in which the user device operates in the first mode. Suppressing the secondary audio signals may comprise suppressing the output of the audio signals from all applications executing at the user device which are not involved with the communication session.

According to a second aspect of the invention there is provided a user device for controlling audio signals during a communication session between the user device and a remote node, the user device comprising: audio input means for receiving a primary audio signal for transmission to the remote node in the communication session; determining means for determining whether the user device is operating in (i) a first mode in which secondary audio signals output from the user device are likely to disturb the primary audio signal received at the audio input means, or (ii) a second mode in which secondary audio signals output from the user device are not likely to disturb the primary audio signal received at the audio input means; and suppressing means for selectively suppressing the secondary audio signals from being output from the user device during the communication session in dependence upon the determining means determining that the user device is operating in the first mode, such that when the user device is operating in the first mode said secondary audio signals do not disturb the primary audio signal received at the audio input means for transmission to the remote node in the communication session.

The user device may, for example, be one of a television, a telephone and a computer.

According to a third aspect of the invention there is provided a computer program product comprising computer readable instructions for execution by computer processing means at a user device for controlling audio signals during a communication session between the user device and a remote node, the instructions comprising instructions for: receiving a primary audio signal at audio input means of the user device for transmission to the remote node in the communication session; determining whether the user device is operating in (i) a first mode in which secondary audio signals output from the user device are likely to disturb the primary audio signal received at the audio input means, or (ii) a second mode in which secondary audio signals output from the user device are not likely to disturb the primary audio signal received at the audio input means; and in dependence upon determining that the user device is operating in the first mode, selectively suppressing the secondary audio signals from being output from the user device during the communication session, such that when the user device is operating in the first mode said secondary audio signals do not disturb the primary audio signal received at the audio input means for transmission to the remote node in the communication session.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Preferred embodiments of the invention will now be described by way of example only. The preferred embodiments described below refer to a "hands-free" mode of a user device. This is just one example of an operational mode of a user device in which secondary audio signals output from the user device are likely to disturb the primary audio signal received at the audio input means, and it would be clear to a skilled person that the invention could be implemented with suitable operational modes of a user device other than a "hands-free" mode as described in the preferred embodiments below.

In preferred embodiments, if the user device is in a hands-free mode, secondary sounds (or "secondary audio signals") are suppressed from being output from a user device during a call such that only audio data received from a remote node in a communication session is output at a speaker of the user device during a call.

Figure 2:
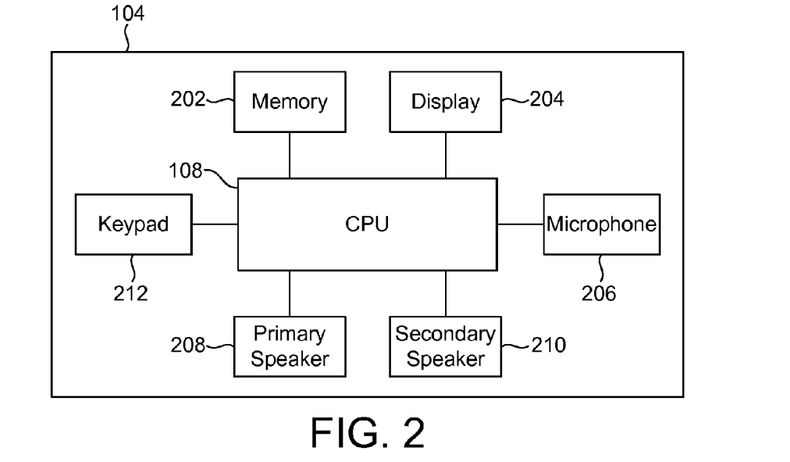
FIG. 2 shows a schematic diagram of a user device according to a preferred embodiment.

The user 102 intends to input speech data into the microphone 206 for transmission over the communication system 100 to the user terminal 114 in a call. The user 102 also intends to listen to audio data received from the user device 114 and output from the speaker(s) (208 and/or 210) in the call. If the user device 104 is in a non hands-free mode then the user 102 can also listen to other audio data which is output from the speaker(s) (208 or 210) during the call. However, if the user device 104 is in the hands-free mode then the other audio data is suppressed from being output from the speaker(s) (208 or 210) during the call.

In preferred embodiments, the secondary sounds are only suppressed if it is detected that the user device is in the hands-free mode. The operational mode of the user device can be determined by e.g. determining the activity of an echo canceller (which performs acoustic echo cancelation (EAC)) or an echo suppressor (which performs acoustic echo suppression (EAS)) at the user device. In this case the user device may query how active the EAC/EAS was in a given time frame. The use of EAC or EAS is known in the art to prevent audio signals received in a call from a remote node in a communication session and output to the user at the user device from being received at the microphone and transmitted back to the remote node in the call. Algorithms are known in the art to prevent this type of "echo" from occurring in calls. Determining the activity of the EAC or EAS allows the user device to determine if the current audio connection is in the so-called hands-free mode (which uses speakers to output audio data to a user in a call and a microphone to receive audio data from the user, wherein the microphone records the audio signals output from the speakers to high degree). The knowledge of whether an audio connection is in the hands-free mode can be used to enable counter measures for reducing the disturbance caused by secondary audio signals output from the user device on the primary audio signal received at the microphone of the user device. The counter measures may include disabling the playback of sound (other than that of the call) for the duration of the call, or for as long as the hands-free mode is used. If the operating system of the user device on which the application handling the call is executed allows it, the application could disable sound output from all other applications at the user device for the runtime of a hands-free call.

The application handling the call at the user device may detect whether or not the user device is in the hands-free mode by detecting the type of audio input means used to receive audio signals from the user. If the audio input means is comprised in a headset or a remote device such as a TV remote control then it can be determined that the user device is not operating in the hands-free mode if these audio input means are not capable of operating in the hands-free mode.

Alternatively, the application handling calls at the user device may determine that the user device is operating in the hands-free mode if the user device only has hands-free capability. For example some models of television may only allow the user to conduct a call using a microphone that is located by the television, in which case where the user device is one of those televisions, it can be determined that the user device must be operating in the hands-free mode.

By disabling the playback of sounds during a call in which the user device is operating in the hands-free mode the overall call experience of the remote participant(s) of the call increases, because they are not distracted by sounds which are not part of the call. However in the case where the user is not in hands free mode, the user may continue listen to secondary sounds such that the user may continue to use other applications (which are not related to the call) or be notified of other events by the application handling the call without disturbing the call. The application handling the call may, for example, be a communication client installed at the user device.

One use case is when the user device is a television. In this case the user may chose to speak into a microphone located on a remote device such as a remote control and continue watching television. In this case the application handling the call at the television determines that the television is not operating in the hands-free mode, and therefore allows the audio signals from the television to continue to be output, even when the television is engaged in a call. However the user may instead choose to use the 'hands free' microphone located in the housing of the television for the call. The microphone may be located within the housing of the television, or on a webcam that is connected to the TV. In this case it is determined that the television is operating in the hands-free mode such that the sounds output from the television will be suppressed, for example by either controlling the TV to mute the sound, or to pause the media.

Figure 1:
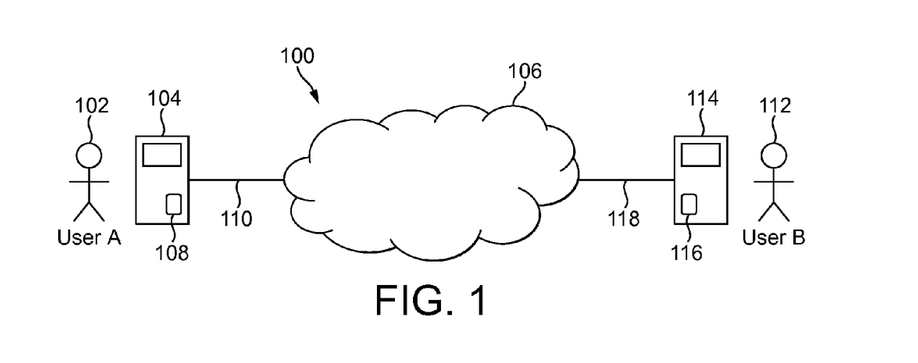
FIG. 1 shows a communication system according to a preferred embodiment.

Reference is now made to FIG. 1, which illustrates a communication system 100 of a preferred embodiment. A first user of the communication system (User A 102) operates a user device 104. The user device 104 may be, for example a mobile phone, a television, a personal digital assistant ("PDA"), a personal computer ("PC") (including, for example, Windows™, Mac OS™ and Linux™ PCs), a gaming device or other embedded device able to communicate over the communication system 100. The user device 104 is arranged to receive information from and output information to the user 102 of the device. In a preferred embodiment the user device 104 comprises output means such as speakers and/or a display and input means such as a microphone, keypad, joystick, touch-screen, keyboard and/or mouse.

The user device 104 comprises a central processing unit (CPU) 108 which may be configured to execute an application such as a communication client for communicating over the communication system 100. The application allows the user device 104 to engage in calls and other communication sessions (e.g. instant messaging communication sessions) over the communication system 100. The user device 104 can communicate over the communication system 100 via a network 106, which may be, for example, the Internet or the Public Switched Telephone Network (PSTN). The user device 104 can transmit data to, and receive data from, the network 106 over the link 110.

FIG. 1 also shows a remote node with which the user device 104 can communicate over the communication system 100. In the example shown in FIG. 1, the remote node is a second user device 114 which is usable by a second user 112 and which comprises a CPU 116 which can execute an application (e.g. a communication client) in order to communicate over the communication network 106 in the same way that the user device 104 communicates over the communications network 106 in the communication system 100. The user device 114 can transmit data to, and receive data from, the network 106 over the link 118. Therefore users A and B (102 and 112) can communicate with each other over the communications network 106, e.g. by transmitting speech signals to each other. There may be more users in the communication system 100, but for clarity only the two users 102 and 112 are shown in the communication system 100 in FIG. 1. The remote node with which the user device 104 communicates may be a user device as shown in FIG. 1 or a server node, such as a voicemail server in the communication system 100.

FIG. 2 illustrates a detailed view of the user device 104 comprising the CPU 108. Connected to the CPU 108 is a memory 202, a display 204 such as a screen, input devices such as a keypad 212 and a microphone 206. Audio output means are also connected to the CPU 108, such as the primary speaker 208 and the secondary speaker 210 shown in FIG. 2. The display 204 may comprise a touch screen for inputting data to the CPU 108. The memory 202, display 204, keypad 212, microphone 206 and primary and secondary speakers 208 and 210 are integrated into the user device 104 (e.g. when the user device 104 is a mobile phone). In alternative user devices one or more of the memory 202, display 204, the keypad 212, the microphone 206 and primary and secondary speakers 208 and 210 may not be integrated into the user device 104 and may be connected to the CPU 108 via respective interfaces. One example of such an interface is a USB interface. The CPU 108 may be connected to a network interface (not shown) such as a modem for communication with the network 106 for communicating over the communication system 100. The network interface may be integrated into the user device 104, or alternatively, the network interface might not be integrated into the user device 104.

Preferred embodiments of the operation of the user device 104 when participating in a communication session with the user device 114 over the communication system 100 will now be described with reference to FIGS. 3 and 4.

Figure 3:
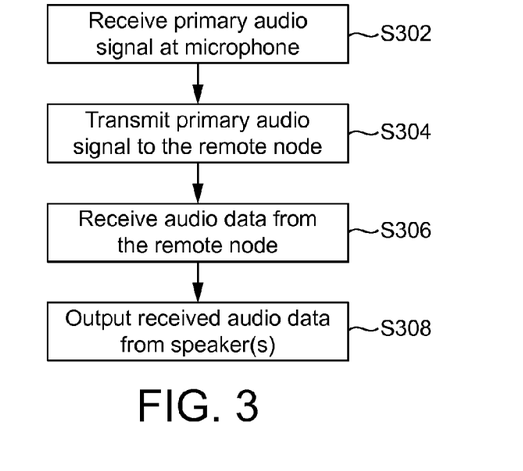
FIG. 3 is a flow chart of a process of a user device engaging in a call with a remote node according to a preferred embodiment.

FIG. 3 shows a flow chart of a process of the user device 104 engaging in a call with a remote node according to a preferred embodiment. In the preferred embodiments described below, the remote node is the user device 114, but it would be apparent to a person skilled in the art that the remote node is not necessarily a user device, and as described above may instead be a server in the communication system 100, such as a voice mail server. In step S302 a primary audio signal is received at the microphone 206 of the user device 104. The primary audio signal is to be transmitted to the user device 114 in a call between the user terminals 104 and 114. The primary audio signal may include speech data from the user 102 for transmission in the call to the user terminal 114. The primary audio signal may also include other audio signals, such as background noise.

In step S304 the primary audio signal received at the microphone 206 in step S302 is transmitted to the user device 114 in the call over the communication network 106. A skilled person would be aware of how to transmit the primary audio signal over the network 106 from the user device 104 to the user device 114. This transmission may include sampling, quantising, encoding and packetizing the primary audio signal received at the microphone 206 and then transmitting audio data packets over the network 106 to the user device 114. The precise details of how the primary audio signal is transmitted from the user device 104 to the user device 114 depend upon the nature of the devices 104 and 114 as well as the nature of the network 106 (e.g. the network may be the internet or the PSTN, each having their own protocols for transmitting audio signals), and the skilled person would be aware of a suitable method of implementing the transmission, and as such the precise details of implementing the transmission are not described further herein.

In the call with the user device 114, the user device 104 may receive audio data from the user device 114 in step S306. The audio data received from the user device 114 is to be output from the speakers (208 or 210) of the user device 104 in the call. Indeed in step S308 the audio data received in step S306 is output from one (or both) of the speakers 208 or 210. A skilled person would know how to output the received audio data at the user device, and as such the precise details of steps S306 and S308 are not described further herein.

The steps S302 to S308 show the steps performed at the user device 104 for transmitting and receiving audio data in a call with the user device 114. As described above, a skilled person would be aware of how to perform steps S302 to S308. Corresponding steps to steps S302 to S308 will be performed at the user device 114 (as well as at the user device 104 as described above), thereby allowing the user 102 to engage in a two way call with the user 112 over the communication system 100.

Figure 4:
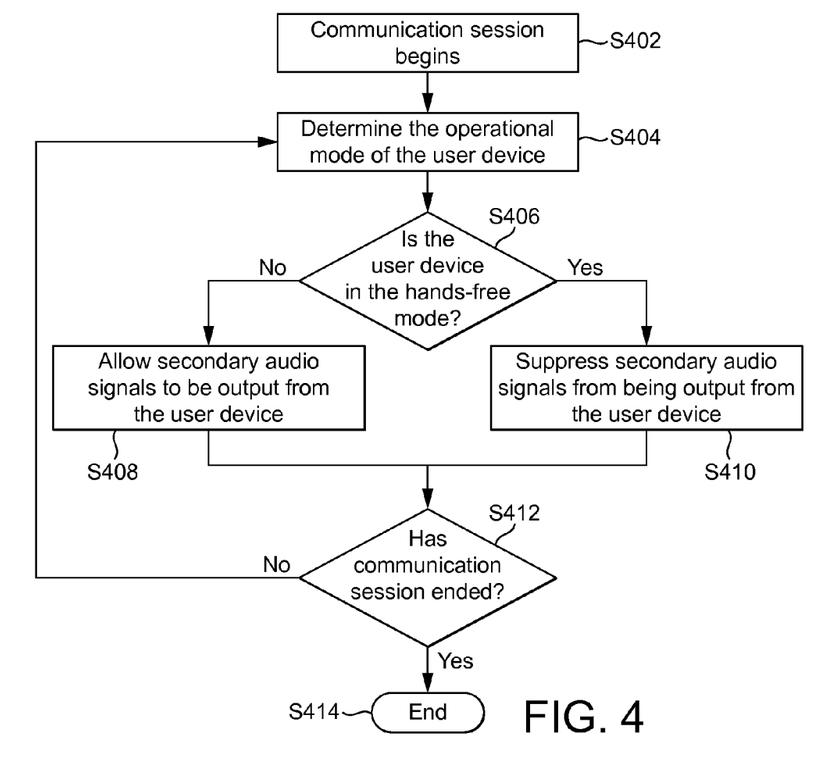
FIG. 4 is a flow chart of a process of selectively suppressing the output of secondary audio signals from a user device according to a preferred embodiment.

FIG. 4 shows a flow chart of a process of selectively suppressing the output of secondary audio signals according to a preferred embodiment. Secondary audio signals are audio signals output from the user device 104 (e.g. via speakers 208 or 210) which are not intended to be received at the microphone 206 and transmitted to the user device 114 as part of the call (in steps S302 and S304). The "secondary audio signals" do not include audio data received from the user device 114 in the call. Audio data received from the user device 114 in the call is output from the user device 104 during the call, and is not suppressed. The acoustic echo cancelation (EAC) or acoustic echo suppression (EAS) described above is used, as is known in the art, to prevent the audio data received from the user device 114 in the call being output from the speakers (208 or 210), received at the microphone 206 and then transmitted back to the user device 114 in the call. Therefore, although the audio data received from the user device 114 is not suppressed from being output at the user device 104 during the call, the EAC or EAS prevents this audio data from disturbing the primary audio signal that is received and transmitted from the user device 104 to the user device 114 in the call.

In step S402 a communication session, such as a call between the user devices 104 and 114, begins. The communication session proceeds as described above in relation to FIG. 3 such that audio data is transmitted from, and received at, the user device 104 over the network 106.

In step S404 the operational mode of the user device 104 is determined. In particular, it is determined whether or not the user device 104 is operating in a mode (referred to herein as the "hands-free" mode) in which the secondary audio signals output from the user device 104 are likely to disturb the primary audio signal received at the microphone 206.

Different methods may be employed for determining the operational mode of the user device 104 in step S404. For example, an application executing on the CPU 108 for handling communication over the communication system 100 (e.g. a communication client installed on the user device 104) may utilize software for performing acoustic echo cancelation (EAC) or acoustic echo suppression (EAS) on the audio signal received at the microphone 206. As is known in the art, EAC and EAS aim to prevent the audio data received from the user device 114 in the call being output from the speakers (208 or 210), received at the microphone 206 and then transmitted back to the user device 114 in the call. In order to do this the EAC or EAS algorithms record temporary usage statistics of the signal strength with which the audio data output from the speakers 208 or 210 in the call is received at the microphone 206 for a given period of time. The application handling the call at the user device 104 can query the statistics from the EAC/EAS at any given time. By evaluating these statistics, for example by comparing the signal strength of secondary audio signals received at the microphone 206 against given signal strength thresholds, the application can judge whether the current active audio connection of the call is using the hands-free mode. For example, if the secondary audio signals are received at the microphone with a signal strength above a particular threshold this may indicate that the user device 104 is operating in the hands-free mode. The particular threshold may be a signal strength above which the secondary audio signals disturb the primary audio signals received at the microphone 206. The primary audio signal can be thought of as being "disturbed" if a user's perception of the quality of the primary audio signal as received at the microphone 206 is significantly detrimentally affected. The threshold at which the secondary audio signals begin to disturb the primary audio signal may therefore be subjective. As such, the threshold signal strength may be adjusted. The application handling the call at the user device 104 may adjust the threshold signal strength in dependence upon parameters determined by the application, such as the signal-to-noise ratio of the primary audio signal, the network bandwidth available in the network 106 for the call or the available CPU resources at the user device 104. The threshold signal strength may also be adjusted by the user 102 such that the user 102 can adjust the threshold to match the level at which he considers the secondary audio signals begin to "disturb" the primary audio signal received at the microphone 206.

As described above, the user device 104 includes a primary speaker 208 and a secondary speaker 210. For example, the user device 104 may be a telephone wherein the primary speaker 208 is located in, or near, the earpiece of the telephone and outputs audio signals at a relatively low volume (because the user 102 should hold the earpiece of the telephone close to his ear during use), whilst the secondary speaker 210 is located elsewhere in the telephone and is intended to be used to output audio signals at a relatively high volume. The primary speaker 208 may be used to output audio signals when the telephone is not in the hands-free mode, whereas the secondary speaker 210 may be used to output audio signals when the telephone is in the hands-free mode. When the secondary speaker 210 is used (in the hands-free mode) the outputted audio signals are more likely to be received at the microphone 206 with a signal strength above the threshold signal strength mentioned above, and are therefore more likely to disturb the primary audio signal received at the microphone 206.

There are other ways of determining the operational mode of the user device 104 in step S404. For example, the application handling the call at the user device 104 may detect the type of audio input means used (e.g. the type of the microphone 206). If it is detected that the microphone is part of a headset, or remote device such as a TV remote control, then this indicates that the user device 104 is not operating in the hands-free mode (because the microphone is sufficiently far away from the speakers used to output audio signals that the secondary audio signals are not likely to disturb the primary audio signal received at the microphone 206).

Another way of determining the operational mode of the user device 104 is to determine the type of the user device 104. Some user devices may only be able to operate in one mode. For example, the application handling the call may determine that the user device 104 is operating in the hands-free mode if the user device 104 only has hands-free capability. For example, some models of television may only allow the user to conduct a call using a microphone that is located in the television itself. Therefore, the application can determine that the user device 104 is one of those televisions to thereby determine that the user device 104 must be operating in the hands-free mode. The application may store a device ID identifying the type of the user device at the user device 104, for example in the memory 202. The application can retrieve the device ID from the memory 202 in order to determine the type of the user device 104.

In some embodiments, an indicator of the current mode of the user device 104 may be stored at the user device 104 (for example in the memory 202 or in a register, as is known in the art). The application handling the call can keep the indicator of the current mode accurate by updating the indicator when the user device 104 is switched on and every time that the operational mode of the user device 104 changes. For example, the user 102 may choose to change the operational mode of the user device 104 (e.g. by changing his preferences for using the user device 104) and the indicator can be updated accordingly. The application handling the call can access the indicator stored at the user device 104 in order to determine the current mode of the user device 104. Storing an indicator of the current mode of the user device 104 is particularly useful if the user device 104 supports only one operational mode (e.g. the hands-free mode) to thereby avoid the need to frequently check the EAC or the EAS.

A person skilled in the art may be aware of other ways of determining the mode of the user device in step S404. The process shown in the flow chart of FIG. 4 splits in step S406 depending upon whether it has been determined that the user device 104 is operating in the hands-free mode. As described above, whilst in the preferred embodiments we refer to the "hands-free mode", the method is equally applicable to any operational mode of the user device 104 in which secondary audio signals output from the user device would disturb the primary audio signal received at the audio input means, and is not necessarily limited to only modes in which the user 102 is not required to use his hands to engage in a call. However, the most common of these modes is the hands-free mode, and as such the preferred embodiments describe the method in terms of the hands-free mode.

If the user device 104 is not in the hands-free mode then the method passes to step S408 in which the secondary audio signals are allowed to be output from the user device 104. For example, the user device 104 may output music while the communication session proceeds. As an example, the user 102 may be using a microphone in a television remote control to receive speech data from the user 102 for transmission in the communication session, whilst the speakers on the television may continue to output audio signals, such as television media or music. In this way the user 102 can proceed to experience the secondary audio signals output from the television. The secondary audio signals do not significantly disturb the speech signals received at the microphone in the remote control, such that the quality of the primary audio signal is not significantly detrimentally affected in the communication session. Following step S408 the method passes to step S412 which is described in more detail below.

However, if it is determined that the user device 104 is operating in the hands-free mode the method proceeds from step S406 to step S410 in which the secondary audio signals are suppressed from being output from the user device 104. Since in the hands free mode the secondary audio signals output from the user device 104 are likely to disturb the primary audio signal received at the microphone 206 then it is beneficial to suppress the output of the secondary audio signals. In this way, the quality of the audio signals (the "primary audio signals") transmitted in the communication session can be maintained at a sufficient level. It may be the application for handling the call that suppresses the output of the secondary audio signals.

One way of suppressing the output of the secondary audio signals in step S410 is to disable the playback of any audio signals other than those associated with the communication session. The application handling the call may disable the audio output for any other application which is running on the user device 104. As an example, where the user device 104 is a television, the application handling the call may mute the audio output from the television application of the television or pause the media of the television application to thereby suppress the secondary audio signals in step S410.

Following step S410 the method passes to step S412. In step S412 it is determined whether the communication session has ended. If it is determined in step S412 that the communication session has ended then in step S414 the method ends. However, if it is determined in step S412 that the communication session has not ended then the method passes back to step S404. In this way the method can periodically repeat the steps S404 to S412 to ensure that when the mode of the user device 104 changes, the selective suppression of the secondary audio signals (in steps S408 and S410) can adapt accordingly. In this way, the secondary audio signals may be suppressed for the duration of the communication session, or for the time in which the user device 104 is operating in the hands-free mode.

The method steps S404 to S412 can be implemented in software executed on the CPU 108 of the user device 104. In order to achieve this a computer program product comprising computer readable instructions can be executed by the CPU 108 for controlling audio signals during a communication session according to the method described above. Alternatively, the methods steps S404 to S412 can be implemented in hardware or firmware at the user device 104.

The preferred embodiments described above transmit audio data over a network 106, which may be a packet-based network such as the Internet or a circuit switched network such as the PSTN.

The method described above provides for selectively suppressing secondary audio signals which may be output from the user device 104 depending upon the mode in which the user device 104 is operating during a communication session. In some modes the secondary audio signals are likely to disturb the primary audio signal received at the microphone 206 and it is in those modes that the secondary audio signals are suppressed during a communication session. However, in other modes the secondary audio signals are not likely to disturb the primary audio signal received at the microphone 206 and it is in those other modes that the secondary audio signals are not suppressed during a communication session. Different speakers (such as primary and secondary speakers 208 and 210) may be used to output the secondary audio signals in different modes and it may be for that reason that the likelihood of the secondary audio signals disturbing the primary audio signal received at the microphone 206 differs between the modes. Furthermore, different microphones (e.g. a microphone in the housing of the user device, such as in a television, as compared to a microphone in a peripheral device of the user device such as in a remote control of a television) may be used to receive the primary audio signal in different modes it may be for that reason that the likelihood of the secondary audio signals disturbing the primary audio signal received at the microphone differs between the modes.

While this invention has been particularly shown and described with reference to preferred embodiments, it will be understood to those skilled in the art that various changes in form and detail may be made without departing from the scope of the invention as defined by the appendant claims.

The invention claimed is:

1. A method comprising: receiving a speech signal at audio input means of a user device for transmission to a remote node in a communication session; determining, using a processor of the user device, whether the user device is operating in a first mode in which a signal strength of secondary audio signals output from the user device is above a threshold strength, or a second mode in which the signal strength of the secondary audio signals output from the user device is below the threshold strength, the secondary audio signal generated by an application of the user device which is not involved with the communication session; and, selectively suppressing the secondary audio signals from being output from the user device during the communication session if it is determined that the user device is operating in the first mode, and not suppressing the secondary audio signals from being output from the user device during the communication session if it is determined that the user device is operating in the second mode.

2. The method of claim 1 further comprising outputting, 5 from audio output means of the user device, audio data received at the user device from the remote node in the communication session.

3. The method of claim 1 wherein said determining whether the user device is operating in the first mode or the second mode further comprises: determining an activity of an echo canceller or an echo suppressor at the user device; and determining that the user device is operating in the first mode if said activity of the echo canceller or the echo suppressor indicates that the secondary audio signals output from the user device are received at the input means with the signal strength above the threshold strength.

4. The method of claim 1 (wherein said) determining whether the user device is operating in the first mode or the second mode further comprises: determining a type of the user device; and determining that the user device is operating in the first mode if it is determined that the type of the user device indicates that the user device is capable of operating only in the first mode.

5. The method of claim 4 wherein said determining the type of the user device comprises determining a device ID identifying the type of the user device.

6. The method of claim 1 wherein said determining whether the user device is operating in the first mode or the second mode further comprises determining a type of the audio input means.

7. The method of claim 1 wherein said determining whether the user device is operating in the first mode or the second mode further comprises accessing an indicator of a current mode from a store of the user device.

8. The method of claim 1 wherein suppressing the secondary audio signals comprises suppressing the output of the secondary 25 audio signals for a duration of the communication session.

9. The method of claim 1 wherein suppressing the secondary audio signals comprises suppressing the output of the secondary audio signals during the communication session for a duration of time in which the user device operates in the first mode.

10. The method of claim 1 wherein suppressing the secondary audio signals comprises suppressing the output of the audio signals from all applications executing at the user device which are not involved with the communication session.

11. The method of claim 1 wherein the first mode is a hands-free mode.

12. A user device comprising: audio input means for receiving speech signal for transmission to a remote node in a communication session; determining means for determining, using a processor of the user device, whether the user device is operating in a first mode in which a signal strength of secondary audio signals output from the user device is above a threshold strength, or a second mode in which the signal strength of the secondary audio signals is below the threshold strength, the secondary audio signal generated by an application of the user device which is not involved with the communication session; and suppressing means for selectively suppressing the secondary audio signals from being output from the user device during the communication session if it is determined that the user device is operating in the first mode, and not suppressing the secondary audio signals from being output from the user device during the communication session if it is determined that the user device is operating in the second mode.

13. The user device of claim 12 further comprising audio output means for outputting audio data received at the user device from the remote 10 node in the communication session.

14. The user device of claim 13 further comprising an echo canceller or an echo suppressor for cancelling or suppressing echo in the speech signal relating to the audio data received from the remote node and output from the audio output means, wherein said determining means further comprises means for determining the activity of the echo canceller or the echo suppressor.

15. The user device of claim 12 wherein said determining means comprises means for accessing an indicator of a current mode in which the user device is operating from a store.

16. The user device of claim 12 wherein the user device is one of a television, a telephone, or a computer.

17. A computer readable storage device having computer readable instructions stored thereon that, responsive to execution by a processor, performs a method comprising receiving a speech signal at audio input means of a user device for transmission to a remote node in a communication session; determining whether the user device is operating in a first mode in which a signal strength of secondary audio signals output from the user device is above a threshold strength, or a second mode in which the signal strength of the secondary audio signals output from the user device is below the threshold strength, the secondary audio signals generated by an application of the user device which is not involved with the communication session; and, selectively suppressing the secondary audio signals from being output from the user device during the communication session if it is determined that the user device is operating in the first mode, and not suppressing the secondary audio signals from being output from the user device during the communication session if it is determined that the user device is operating in the second mode.

* * * * *